United States Patent
Rouge et al.

[11] Patent Number: 5,891,218
[45] Date of Patent: Apr. 6, 1999

[54] BED GRANULOMETRY AND THICKNESS OF A PSA UNIT

[75] Inventors: Dominique Rouge, Malakoff; Serge Moreau, Velizy Villacoublay; Christophe Montfort, Buc, all of France

[73] Assignee: L'Air Liquide, Societe Anonyme Pour l'Etude et l'Exploitation des Procedes Georges Claude, Paris Cedex, France

[21] Appl. No.: 966,211

[22] Filed: Nov. 7, 1997

[30] Foreign Application Priority Data

Aug. 28, 1997 [FR] France .................. 97 10745

[51] Int. Cl.⁶ .................................................. B01D 53/047
[52] U.S. Cl. ................................. 95/96; 95/102; 95/130
[58] Field of Search ............................... 95/96–105, 130; 96/108, 130, 133, 144

[56] References Cited

U.S. PATENT DOCUMENTS

| | | | |
|---|---|---|---|
| 3,533,221 | 10/1970 | Tamura | 95/130 X |
| 3,564,816 | 2/1971 | Batta | 95/130 X |
| 3,922,149 | 11/1975 | Ruder et al. | 95/96 X |
| 4,194,891 | 3/1980 | Earls et al. | 95/130 X |
| 4,194,892 | 3/1980 | Jones et al. | 95/130 X |
| 4,406,675 | 9/1983 | Dangieri et al. | 95/130 X |
| 4,614,525 | 9/1986 | Reiss | 95/130 X |
| 4,684,377 | 8/1987 | Haruna et al. | 95/130 X |
| 4,964,888 | 10/1990 | Miller | 95/130 X |
| 5,071,449 | 12/1991 | Sircar | 95/130 X |
| 5,122,164 | 6/1992 | Hirooka et al. | 95/130 X |
| 5,176,721 | 1/1993 | Hay et al. | 95/96 |
| 5,415,683 | 5/1995 | Leavitt | 95/130 X |
| 5,520,720 | 5/1996 | Lemcoff | 95/96 |
| 5,704,964 | 1/1998 | Kaneko et al. | 95/130 X |

FOREIGN PATENT DOCUMENTS

| | | |
|---|---|---|
| 0 258 206 | 3/1988 | European Pat. Off. . |
| 0 391 718 | 10/1990 | European Pat. Off. . |
| 1 278 006 | 12/1986 | U.S.S.R. . |

*Primary Examiner*—Robert Spitzer
*Attorney, Agent, or Firm*—Young & Thompson

[57] ABSTRACT

A PSA process for the separation of a gaseous flow containing essentially oxygen and nitrogen, such as air, by preferential adsorption of the nitrogen on at least one bed of a thickness (e) of an adsorbent material of mean granulometry (d) in at least one separation zone, in which there is selected a thickness (e) of the adsorbent bed such that:

$$300 \leq \frac{e}{\sqrt{d}} \leq 1000$$

e and d being expressed in mm.

12 Claims, 5 Drawing Sheets

BED GRANULOMETRY AND THICKNESS OF A PSA UNIT

FIELD OF THE INVENTION

The invention relates to a PSA type process for the separation of a gaseous flow containing essentially oxygen and nitrogen, such as air, by preferential adsorption of the nitrogen on an absorbing material, such as a zeolite, so as to produce oxygen or a gas flow enriched in oxygen, which is to say impoverished in nitrogen.

BACKGROUND OF THE INVENTION

Oxygen is a gas having high industrial interest because it finds multiple applications in various technical fields: production of steel, glass or paper, medicine, metal welding, combustion or pollution control, for example.

One of the techniques used at present to produce oxygen is the "PSA" (Pressure Swing Adsorption) technique. In the context of the invention, there is meant by PSA processes, not only the PSA processes as such, but also similar processes, such as VSA (Vacuum Swing Adsorption) or MPSA (Mixed Pressure Swing Adsorption) processes.

According to this PSA technique, the oxygen contained in a gaseous mixture comprising essentially oxygen and nitrogen, such as air, is separated from said gaseous mixture by adsorption of nitrogen on a material that preferentially adsorbs nitrogen, said adsorption of the nitrogen being carried out by pressure variation applied in the separation region containing said adsorbent material; the oxygen that is not adsorbed or is little adsorbed is recovered at the outlet of said separation zone.

Such PSA processes have already been described many times in the prior art. Generally speaking, a PSA process always comprises:

- an adsorption step selective to nitrogen, on an adsorbent material, at an adsorbent pressure called "high pressure";
- a desorption step of the nitrogen trapped by the adsorbent, at a desorption pressure lower than the adsorption pressure, called a "low pressure";
- a repressurization step of the separation zone comprising the adsorbent, by passage from low pressure to high pressure; and the produced oxygen being recovered during the adsorption phase of the nitrogen.

From this, it is easy to understand that the efficiency of separation of the gaseous mixture depends on numerous parameters, such as the high pressure, the low pressure, the type of adsorbent material, and the affinity of the latter for the components to be separated, the composition of the gaseous mixture to be separated, the temperature of adsorption of the mixture to be separated, the size and shape of the adsorbent particles, the composition of these particles, the thickness of the adsorption bed and the temperature gradient established within said bed, for example.

Until now, no overall regulating law has however been able to be determined, because it is very difficult to relate these various parameters to each other.

In particular, although it is known that the thickness of the adsorbent bed, the granulometry of the adsorbent and the dead volumes have more than a negligible influence on the performances of the PSA unit, particularly as to the pressure drop, no method for selection of the thickness of the bed according to the granulometry of the adsorbent, taking account of the dead volumes, has been determined up to the present.

In other words, numerous papers describe the ranges of values of granulometry and the ranges of values of thickness of the bed, but without establishing the existence of any real relationship between these ranges.

Moreover, certain papers disclose combinations of granulometry and cycle time and/or bed thickness.

Thus, EP-A-0 480 797 teaches a PSA process using adsorbent particles of a diameter 0.4 mm to 1.7 mm, and a cycle time of at least 20 to 60 seconds.

Furthermore, U.S. Pat. No. 4,194,892 discloses an adsorbent bed thickness of at most 2.4 m, adsorbent particles of a diameter at most equal to 0.9 mm and a cycle time of at: least 30 seconds, whilst U.S. Pat. No. 4,194,891 describes an adsorbent bed thickness at most equal to 1 m, adsorbent particles of a diameter at most equal to 0.9 mm and a cycle time of less than 18 seconds.

Furthermore, U.S. Pat. No. 5,071,449 describes an adsorbent bed of a thickness 0.15 m to 1 m, adsorbent particles of a diameter 0.2 mm to 1 mm and a cycle time of 6 seconds to 60 seconds, and the document "Gas Separation by Adsorption Processes", Yang, 1989, p. 267, discloses an adsorbent bed thickness of 1.8 m to 3 m, adsorbent particles of a diameter equal to 1.6 mm and a cycle time of 3 minutes to 4 minutes.

It will be noted that, for a same diameter of particles, the bed thickness can vary considerably from one paper to another, without actually giving a precise choice and without taking into consideration the geometrical constraints imposed by the dead volumes within the adsorber.

Furthermore, it is known that adsorbents used in PSA units are expensive and that it is thus necessary and desirable to reduce the quantities of adsorbent used, hence the thickness of the adsorbent beds, so as to reduce the cost of production of oxygen.

However, this reduction of adsorbent bed thickness must not impinge on the performance of the PSA unit, particularly the output and the productivity of said PSA unit.

SUMMARY OF THE INVENTION

The object of the present invention is therefore to provide a PSA process whose bed thickness of adsorbent:

- depends essentially only on the mean granulometry of the adsorbent particles used, particularly the diameter when the adsorbent is in the form of balls,
- takes account of the geometric constraints of the dead volumes,
- does not have a negative influence on the energy consumption of the PSA process.

Moreover, the process of the invention is easy to practice on an industrial scale and permits substantially reducing the costs of production of oxygen.

The present invention thus relates to a PSA process for the separation of a gaseous flow containing essentially oxygen and nitrogen, by preferential adsorption of the nitrogen on at least one bed of a thickness (e) of an adsorbent material of mean granulometry (d) provided in at least one separation zone, in which the thickness (e) of the adsorbent bed is chosen such that:

$$300 \leq \frac{e}{\sqrt{d}} \leq 1000$$

e and d being expressed in millimeters.

In the framework of the present invention, the mean granulometry is the mean hydraulic diameter of the particles of adsorbent material.

Preferably, the ratio (e/√d) is comprised between 400 and 800.

According to the selected embodiment, the process of the invention can include one or several of the following characteristics:

the high pressure of adsorption is comprised between $10^5$ Pa and $10^6$ Pa, the feed temperature ($T_{feed}$) is comprised between 10° C. and 60° C., preferably between 25° C. and 45° C., the gas flow to be separated is air, the adsorbent material is selected from zeolites of type X or A, and, preferably, said zeolite comprises at least 50% $Alo_2$ associated with cations selected from the group comprised by the cations calcium, lithium, zinc, copper, manganese, magnesium, nickel or any alkali or alkaline earth metal, the cycle time is less than 120 seconds, preferably less than 100 seconds, e is comprised between 0.1 m and 2 m, preferably between 0.2 m and 1.5 m, d is comprised between 0.1 mm and 5 mm, preferably between 0.2 mm and 3 mm, the adsorbent is in shapes substantially spherical, ovoidal, oval, rod shaped or the like.

As mentioned above, it is known that the mean granulometry and thickness of the bed of adsorbent have a strong influence on the pressure drop taking place within the adsorbent bed.

So as to limit these pressure drops and hence to maintain constant the performance of the PSA unit, it is thus desirable to decrease the thickness of the adsorbent bed.

However, there exists, within the adsorbers, dead volumes which is impossible to avoid, and which have a negative influence on the performance of the PSA process, namely:

upstream of the adsorbent bed, that is to say on the feed side, there exists an incompressible dead volume of thickness a (VM supply in FIG. 1) representing particularly the space separating the first isolation valve for supplying the adsorbent and the beginning of the adsorbent bed, the bed of particles of a drying material located upstream of the adsorbent bed, the system of distribution of supply gas (air) in the adsorber.

downstream of the adsorbent bed, which is to say on the production side, there also exists an incompressible dead volume of a thickness b (VM production in FIG. 1) representing particularly the space separating the first shut off valve for production of the adsorber at the end of the adsorbent bed, the system of production gas recover (oxygen).

Figure 1:
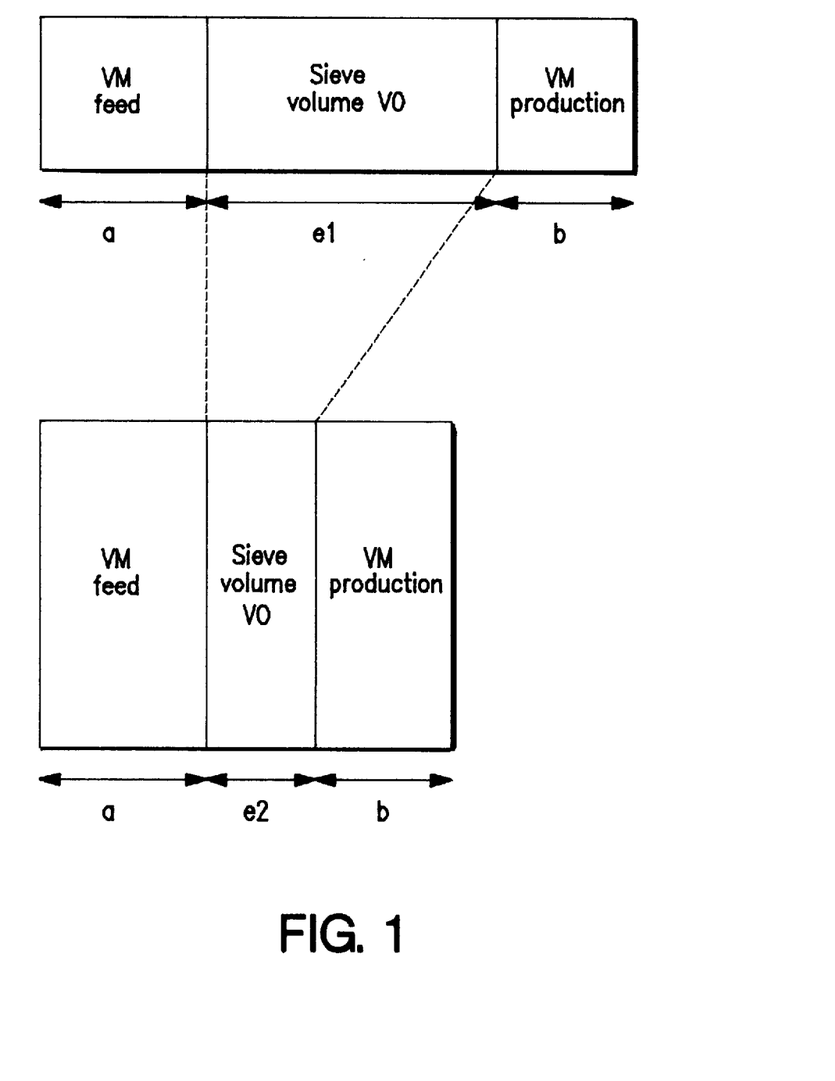
FIG. 1 is a schematic representation of a decrease of the thickness e of an adsorbent bed.

From this, a decrease of the thickness e of the adsorbent bed (decrease from a thickness e1 to a thickness e2) can be schematically represented as shown in FIG. 1, from which it will be seen that, for a given screen thickness e, the dead volumes represent a part equal to: (a+b)/e, of the volume Vo of the adsorbent bed.

In other words, when the thicknesses a and b do not vary (incompressible dead volumes), the proportion of dead volume relative to the adsorbent volume increases in a hyperbolic manner when there is a decrease in thickness e of the adsorbent bed.

It follows that obtaining or maintaining good performances of the PSA unit require precise dimensioning of the bed thickness of the adsorbent of a given mean granulometry.

The invention relates moreover to a device adapted to practice a PSA process, such as the process described above, which comprises moreover at least one separation zone, preferably 1 to 3 separation zones or adsorbers.

BRIEF DESCRIPTION OF THE DRAWINGS

The present invention will now be described in greater detail with reference to examples and figures given by way of illustration but in no way limiting the invention.

DETAILED DESCRIPTION OF THE INVENTION

EXAMPLES

So as to verify the efficacity of a PSA process according to the invention, a study by simulation and an economic estimation of each test of the simulation have been carried out according to the design set forth hereinafter.

The following results have been simulated (in an isothermal mode) with the aid of a suitable simulation program. The program used for simulation relies on the principles of conservation of mass, conservation of enthalpy, conservation of the quantity of movement and uses the model of the Linear Driving Force (see "Principles of Adsorption and Adsorption Processes", John Wiley & Sons, 1984; D. M. Ruthven, pp. 242–243; or "Pressure Swing Adsorption", VCS Publishers, 1994, pp. 58–61) for the kinematic evaluation of the solids-gas transfer within the adsorbent mass. Such simulation models are particularly described in Pressure Swing Adsorption, Ruthven, Farooq and Knaebel, VCH Publishers, 1994, pp. 172–209; and in Fluid Flow Through Packed Columns, S. Ergun, Chem. Engr. Prog., 48(2), 89(1952). The resolution of the equations can as to themselves be carried out for example by means of the program DIVPAG of the International Mathematical and Statistical Library, sold by the Microsoft™ Company or the ADSIM program sold by the Aspentech™ Company. Those in the art are quite able to select a suitable simulation program from among the numerous available programs on the market and to plug in the preceding data. If needed, one can also refer to the article by D. G. Hartzog and S. Sircar; Adsorption, 1, 133–151 (1995), Sensitivity of PSA Process Performance to Input Variables, describing a similar program.

In all of the following programs, the gaseous mixture to be separated containing essentially oxygen and nitrogen is air.

Moreover, the economic performances of the PSA process of the invention have been evaluated in the same manner for all the following examples, which is to say by simulation and by using the following relations.

The specific energy index (ES) is given by the following formula (at 20° C., for a relative humidity of 70%):

$$ES = \frac{\left(1 - \frac{R}{t} \cdot 0.2096 + 0.0166\right) \cdot \int_{cycle} KW \, (\Delta P) \cdot dt}{R \cdot 0.2096 \cdot \int_{cycle} Q(\Delta P) \cdot \frac{Pasp \cdot 273 \cdot dt}{1.013 \cdot T_{asp}}} \cdot \frac{1}{0.95 \cdot 0.98}$$

in which:

R is the yield (%);

t is the oxygen content of the produced gas;

ΔP is the pressure difference between the intake pressure ($P_{asp}$) and the output pressure ($P_{ref}$) of the machines, which is to say the vacuum pump and the air compressor.

The pressure drops adopted for this computation are 1500 Pa (at $10^5$ Pa) at the intake of the air compressor, 4000 Pa (at $10^5$ Pa) at the output of the air compressor, 2000 Pa (at $10^5$ Pa) at the intake of the vacuum pump and 1500 Pa (at $10^5$ Pa) at the output of the vacuum pump;

Kw is the instantaneous shaft horsepower and Q is the instantaneous flow rate of the machines; these values are given by the technical characteristics of said machines;

the motor output is 95%;

the transmission output is 98%;

$T_{asp}$ is the temperature of the intake air, which is to say the temperature of the air entering the machine.

The investment index ($I_2$) is calculated from a reference investment index ($I_1$) and is given by the following formula:

$$I_2 = \sum_{i=1}^{12} (C1, i) \cdot \frac{(Y2,i)^{\alpha i}}{(Y1,i)^{\alpha i}}$$

in which:

$\sum_{i=1}^{12} (C1,i) = I_1$ is the reference investment calculated from different cost units indicated in the following Table 1.

Y2, i and Y1, i are cost parameters indicated in Table 1.

αi represents the extrapolation power, which takes account of the economies realized for each cost unit (cf. Table 1).

TABLE 1

| COST UNIT | COST | αi | Yi |
|---|---|---|---|
| VALVING, FRAMEWORK, ADSORBER, SUPPORTS | C0.1 | α1 | volume of the adsorbers |
| ADSORBENT | C0.2 | α2 | productivity cost of the sieve |
| VALVES | C0.3 | α3 | yield |
| VACUUM PUMP | C0.4 | α4 | vacuum pump flow |
| INLET AIR COMPRESSOR OF THE PSA | C0.5 | α5 | compressor flow |
| OUTLET OXYGEN COMPRESSOR OF THE PSA | C0.6 | α6 | — |
| REGULATION, CONTROL, AUTOMATION | C0.7 | α7 | — |
| ENGINEERING | C0.8 | α8 | — |
| TRANSPORT | C0.9 | α9 | volume of the adsorbers |
| INSTALLATION AND START UP | C0.10 | α10 | volume of the adsorbers |
| GENERAL COSTS | C0.11 | α11 | — |
| MISCELLANEOUS | C0.12 | α12 | — |

The cost index of oxygen ($Co_2$) is evaluated by means of the following formula:

$$Co_2 = \frac{ES \times Pe + CC \times I}{Pan}$$

in which

ES is the specific energy index;

I is the investment index;

Pe is the mean cost of energy (electricity...);

CC is a cost parameter including depreciation of the installation and maintenance;

Pan is the annual production of oxygen product.

In the following examples, the study of the performances of the PSA process cycle and carried out for a given cycle and with constant machines.

The cycles used have a total duration of 3×15 seconds or 3×30 seconds (3 adsorbers operating in parallel) and can be schematically described as follows:

a production phase properly so-called at a high pressure of the order of $1.1 \cdot 10^5$ Pa, which is to say for adsorption of nitrogen and recovery of oxygen;

a low current equilibrium phase;

a purge phase to low pressure, of the order of $0.3 \cdot 10^5$ Pa, which is to say, for desorption of the nitrogen trapped by the adsorbent bed and evacuation of said nitrogen, an elution phase;

a recompression phase with oxygen product, which is to say passage from low pressure to high pressure for a new separation cycle.

The different simulations have been carried out with constant machines, which is to say the machines (vacuum pump and blower) have been selected so as to provide high and low pressures, respectively, of $1.1 \cdot 10^5$ Pa and $0.3 \cdot 10^5$ Pa, under standard conditions, namely, for an inlet temperature of air of 20° C. ($T_{asp}$) and a supply temperature of air for the adsorbers of 35° C. ($T_{feed}$). The inlet temperature of 20° C. ($T_{asp}$) corresponds actually to the mean temperature of a temperate region, such as Europe.

The adsorbent materials used in the following examples are type A zeolite comprising about 80% of $AlO_2$ associated with calcium cations (hereinafter: CaA). This zeolite, now commercially available, is used in the form of a single bed of thickness e (in mm) within three adsorbers; said zeolite bed being preceded and followed by the mentioned dead volumes.

The results obtained are given in indices.

Example 1

In this example, the minimum thicknesses a and b (compare FIG. 1) of the dead volumes on the feed side (Vm feed) and production side (VM production), respectively, are fixed at: a=240 mm and b =120 mm, which corresponds to 34% and 23%, respectively, by volume of the adsorbent for a bed having a thickness of 700 mm. Here, as in practice, it is sought to decrease as much as possible the thickness of these volumes whose influence is negative.

Moreover, different bed thicknesses are tested for adsorbent particles having a mean granulometry of 0.5 mm, 1 mm, 1.5 mm, and 2 mm, said particles being balls of substantially spherical shape.

The results obtained are given in Tables II (for cycle times 3×15 sec) to IX (for cycle times 3×30 sec) as follows; the cost index of oxygen produced is given for a PSA unit producing 100 tons of oxygen per day.

TABLE II

Mean diameter of the balls: 0.5 mm Cycle time 3 × 15 s

| Bed Thickness (e in mm) | Ratio e/√d | Output (R) | Productivity (P) | Specific Energy (ES) | O₂ cost for 100 t/d |
|---|---|---|---|---|---|
| 200 | 283 | 100 | 104 | 108 | 104 |
| 400 | 566 | 111 | 100 | 100 | 100 |
| 700 | N.D. | N.D. | N.D. | N.D. | N.D. |
| 1,000 | N.D. | N.D. | N.D. | N.D. | N.D. |
| 1,400 | N.D. | N.D. | N.D. | N.D. | N.D. |

N.D.: not determined.

TABLE III

Mean diameter of the balls: 1 mm Cycle time 3 × 15 s

| Bed Thickness (e in mm) | Ratio e/√d | Output (R) | Productivity (P) | Specific Energy (ES) | O₂ cost for 100 t/d |
|---|---|---|---|---|---|
| 200 | 200 | 83 | 100 | 118 | 111 |
| 400 | 400 | 96 | 103 | 103 | 101 |
| 700 | 700 | 100 | 100 | 100 | 100 |
| 1,000 | 1,000 | 97 | 90 | 106 | 106 |
| 1,400 | 1,400 | N.D. | N.D. | N.D. | N.D. |

N.D.: not determined.

TABLE IV

Mean diameter of the balls: 1.5 mm Cycle time 3 × 15 s

| Bed Thickness (e in mm) | Ratio e/√d | Output (R) | Productivity (P) | Specific Energy (ES) | O₂ cost for 100 t/d |
|---|---|---|---|---|---|
| 200 | 163 | 100 | 112 | 122 | 115 |
| 400 | 327 | 117 | 119 | 106 | 104 |
| 700 | 572 | 124 | 120 | 100 | 100 |
| 1,000 | 816 | 125 | 115 | 101 | 101 |
| 1,400 | 1,143 | 117 | 100 | 111 | 110 |

TABLE V

Mean diameter of the balls: 2 mm Cycle time 3 × 15 s

| Bed Thickness (e in mm) | Ratio e/√d | Output (R) | Productivity (P) | Specific Energy (ES) | O₂ cost for 100 t/d |
|---|---|---|---|---|---|
| 200 | 141 | 100 | 100 | 125 | 116 |
| 400 | 283 | 117 | 107 | 107 | 104 |
| 700 | 495 | 126 | 109 | 100 | 100 |
| 1,000 | 707 | 128 | 107 | 100 | 100 |
| 1,400 | 990 | 126 | 100 | 104 | 104 |

TABLE VI

Mean diameter of the balls: 0.5 mm Cycle time 3 × 30 s

| Bed Thickness (e in mm) | Ratio e/√d | Output (R) | Productivity (P) | Specific Energy (ES) | O₂ cost for 100 t/d |
|---|---|---|---|---|---|
| 200 | 283 | 102 | 147 | 110 | 104 |
| 400 | 566 | 114 | 144 | 100 | 100 |
| 700 | 990 | 115 | 129 | 102 | 104 |
| 1,000 | 1,414 | 100 | 100 | 121 | 120 |
| 1,400 | N.D. | N.D. | N.D. | N.D. | N.D. |

N.D.: not determined.

TABLE VII

Mean diameter of the balls: 1 mm Cycle time 3 × 30 s

| Bed Thickness (e in mm) | Ratio e/√d | Output (R) | Productivity (P) | Specific Energy (ES) | O₂ cost for 100 t/d |
|---|---|---|---|---|---|
| 200 | 200 | 85 | 102 | 116 | 107 |
| 400 | 400 | 96 | 103 | 103 | 101 |
| 700 | 700 | 100 | 100 | 100 | 100 |
| 1,000 | 1,000 | 101 | 96 | 101 | 102 |
| 1,400 | 1,400 | 99 | 88 | 105 | 106 |

TABLE VIII

Mean diameter of the balls: 1.5 mm Cycle time 3 × 30 s

| Bed Thickness (e in mm) | Ratio e/√d | Output (R) | Productivity (P) | Specific Energy (ES) | O₂ cost for 100 t/d |
|---|---|---|---|---|---|
| 200 | 163 | 100 | 106 | 118 | 109 |
| 400 | 327 | 113 | 107 | 105 | 102 |
| 700 | 572 | 118 | 107 | 101 | 100 |
| 1,000 | 816 | 120 | 104 | 100 | 100 |
| 1,400 | 1,143 | 120 | 100 | 101 | 102 |

TABLE IX

Mean diameter of the balls: 2 mm Cycle time 3 × 30 s

| Bed Thickness (e in mm) | Ratio e/√d | Output (R) | Productivity (P) | Specific Energy (ES) | O₂ cost for 100 t/d |
|---|---|---|---|---|---|
| 200 | 141 | 100 | 102 | 120 | 110 |
| 400 | 283 | 113 | 104 | 107 | 103 |
| 700 | 495 | 118 | 104 | 102 | 100 |
| 1,000 | 707 | 121 | 103 | 100 | 100 |
| 1,400 | 990 | 121 | 100 | 100 | 101 |

Figure 2:
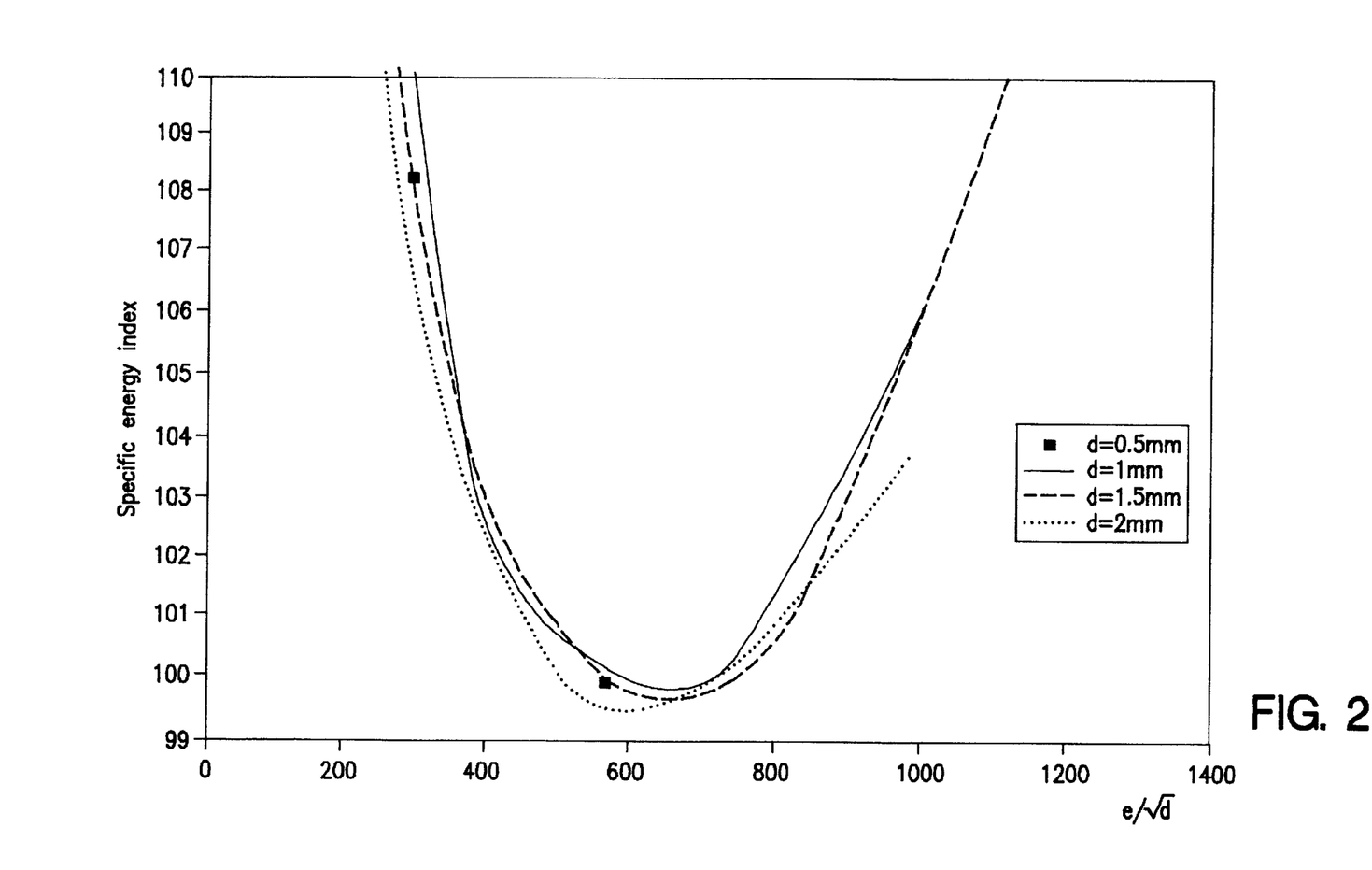
FIG. 2 is a graphical representation of the specific energy index (ES) as a function of the value of the ratio (e/√d) for a cycle of 3×15 seconds.
Figure 3:
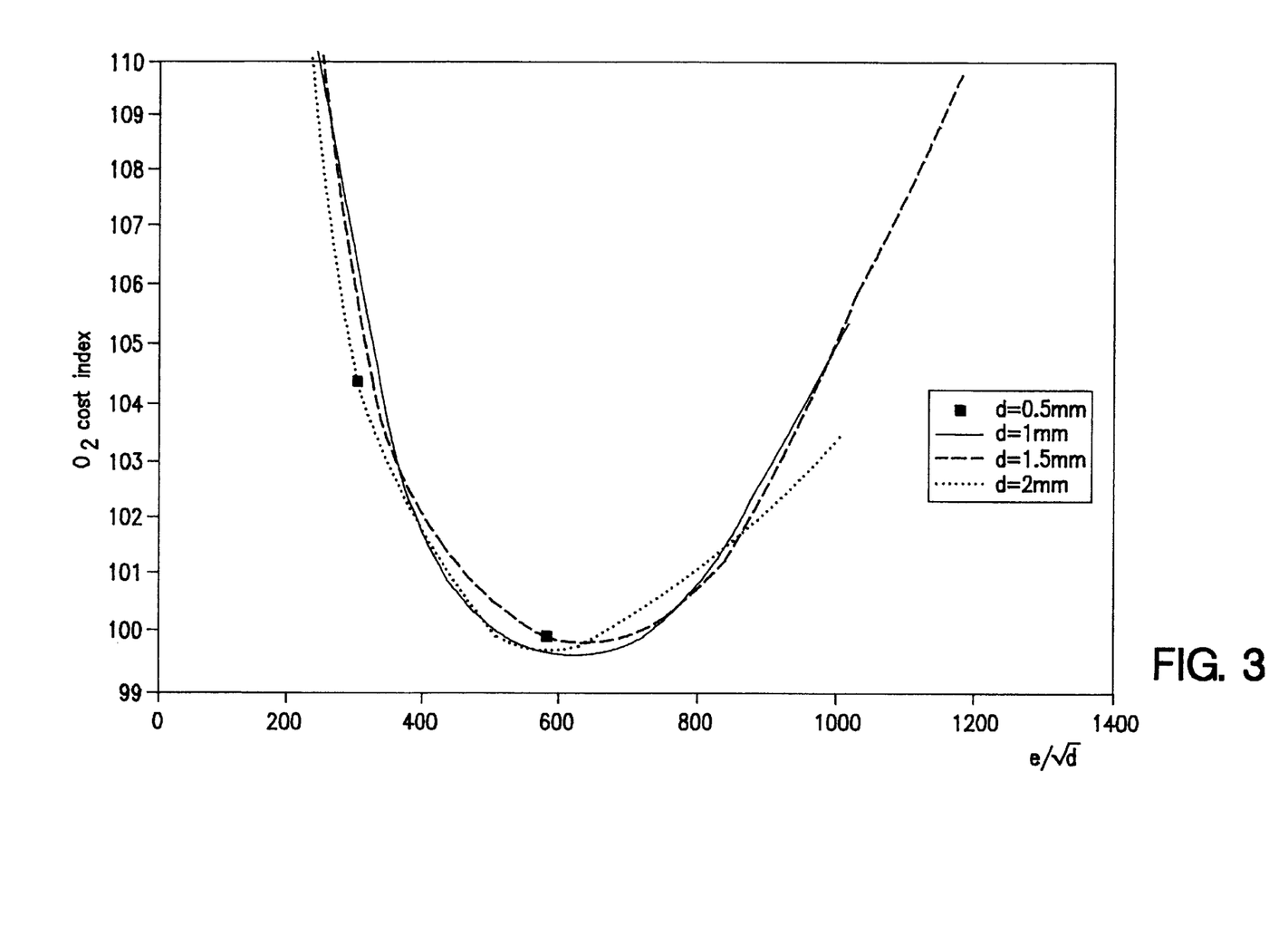
FIG. 3 is a graphical representation of the cost index for product oxygen ($O_2$) as a function of the value of the ratio (e/√d) for a cycle of 3×15 seconds.
Figure 4:
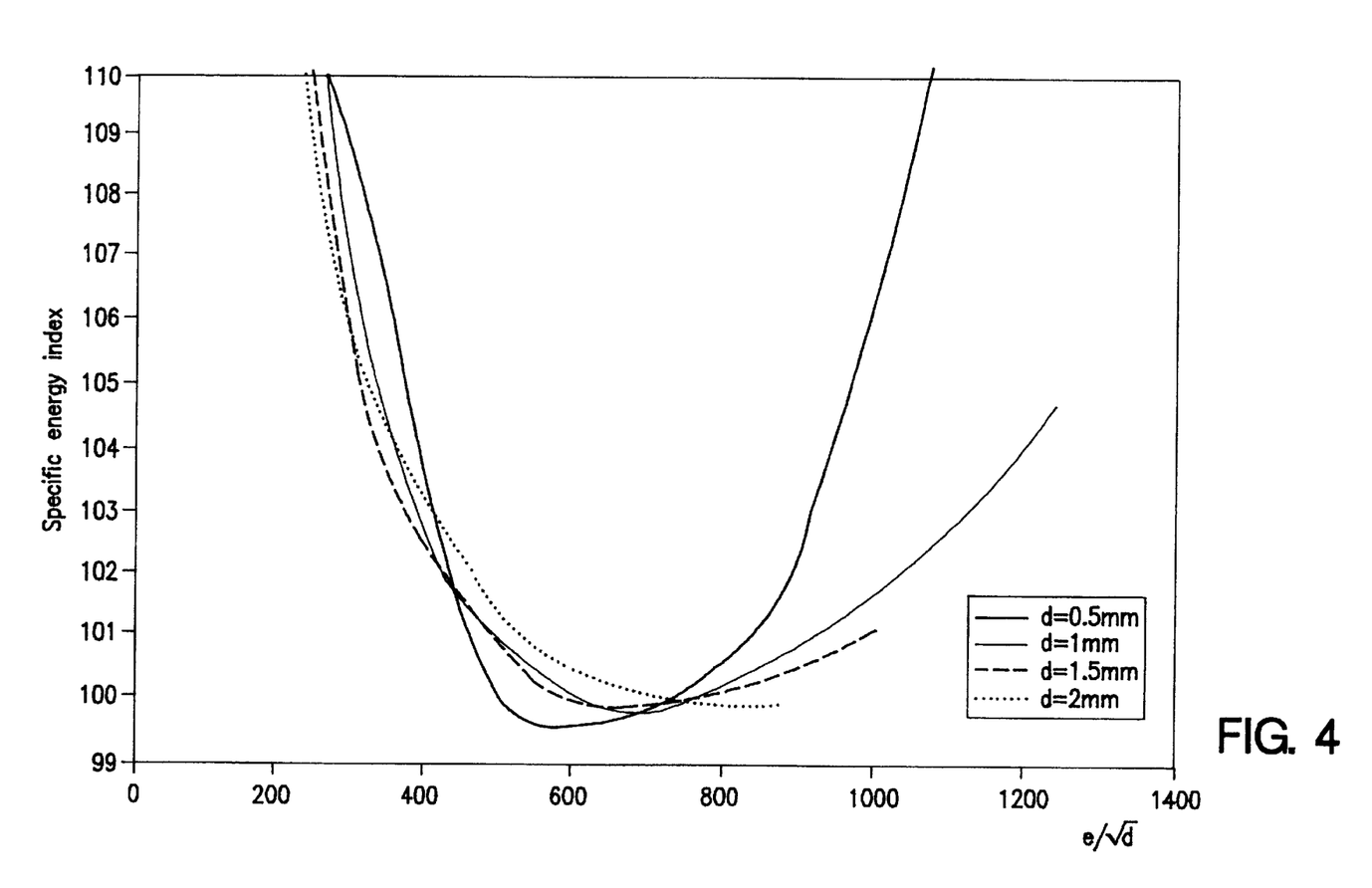
FIG. 4 is a graphical representation of the specific energy index (ES) as a function of the value of the ratio (e/√d) for a cycle of 3×30 seconds.
Figure 5:
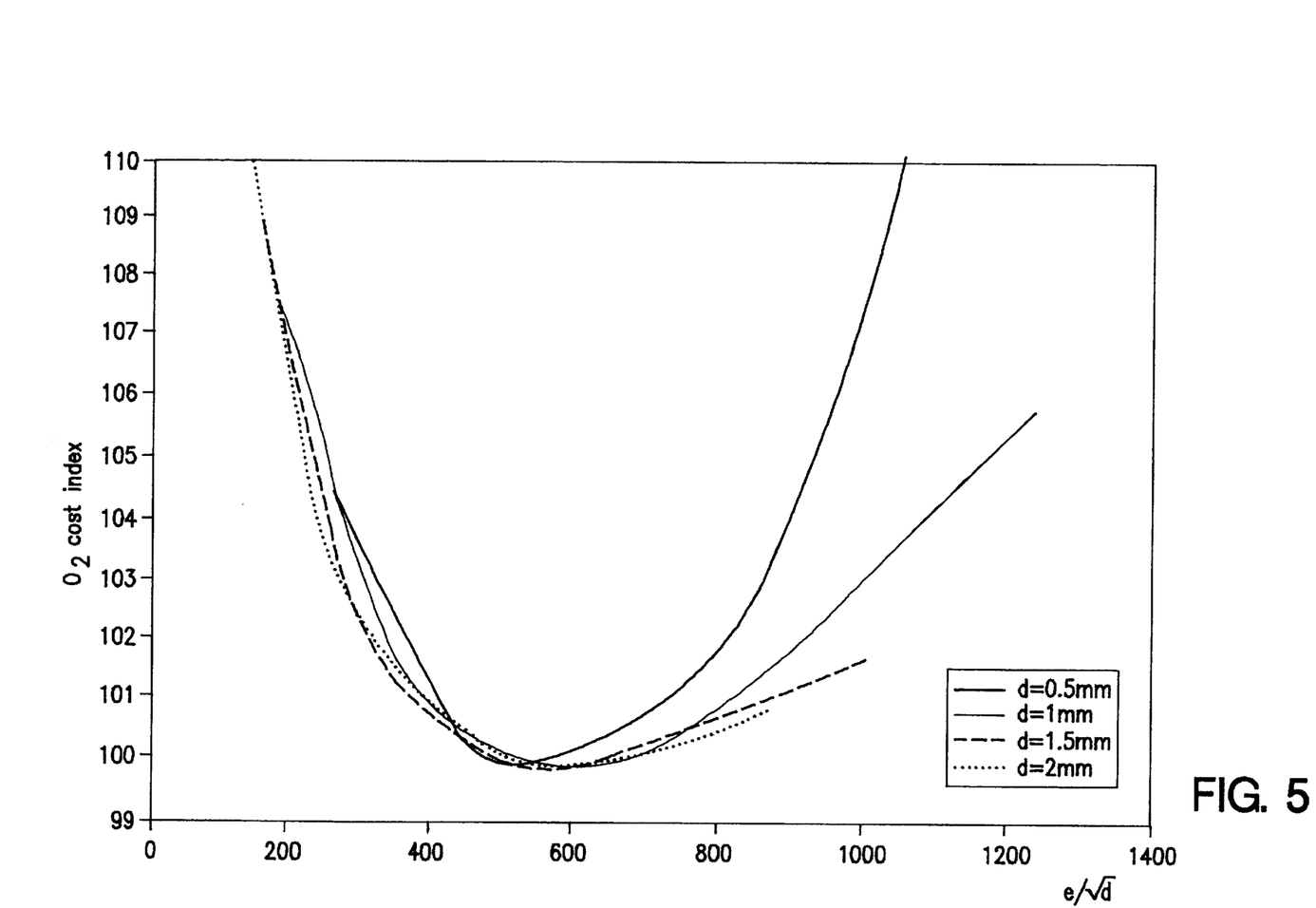
FIG. 5 is a graphical representation of the cost of product oxygen ($O_2$) as a function of the value of the ratio (e/√d) for a cycle of 3×30 seconds.

So as to permit a better comprehension of the results obtained, the cost indices for oxygen products and for specific energy (ES) have been given in FIGS. 2 to 4, which show, respectively:

the specific energy index (ES) as a function of the value of the ratio (e/√d) for a cycle of 3×15 seconds (FIG. 2), the cost index for product oxygen ($O_2$) as a function of the value of the ratio (e/√d) for a cycle of 3×15 seconds (FIG. 3), the specific energy index (ES) as a function of the value of the ratio (e/√d) for a cycle of 3×30 seconds (FIG. 4), and the cost of product oxygen ($O_2$) as a function of the value of the ratio (e/√d) for a cycle of 3×30 seconds (FIG. 5).

It will be immediately apparent from these different curves that the specific energy is a minimum, as is also the cost of oxygen product, for values of the ratio (e/√d) comprised between 300 and 1000, preferably between 400 and 800, and this no matter what the duration of the cycle of the PSA process (3×30 sec or 3×15 sec).

In other words, these different tests show in a surprising manner that when the cycle time is decreased, it is not absolutely necessary to decrease also the bed thickness of the adsorbent and that on the contrary such a decrease of bed thickness of the adsorbent may give rise in certain cases to negative results as to performance of the PSA process used.

We claim:

1. PSA process for the separation of a gaseous flow containing essentially oxygen and nitrogen, by preferential adsorption of nitrogen on at least one bed having a thickness e of adsorbent material of mean granulometry d in at least one separation zone, in which the thickness e of the bed of adsorbent material is selected such that:

$$400 \leq \frac{e}{\sqrt{d}} \leq 800$$

e and d being expressed in mm.

2. Process according to claim 1, wherein the adsorbent material is selected from zeolites of type X or A.

3. Process according to claim 1, wherein the process is carried out at a cycle time of less than 120 seconds.

4. Process according to claim 3, wherein the cycle time is less than 100 seconds.

5. Process according to claim 1, wherein the thickness e is comprised between 0.1 m and 2 m.

6. Process according to claim 5, wherein the thickness e is between 0.2 m and 1.5 m.

7. Process according to claim 1, wherein the mean granulometry d is comprised between 0.1 mm and 5 mm.

8. Process according to claim 7, wherein the mean granulometry d is between 0.2 mm and 3 mm.

9. Process according to claim 1, wherein the shape of the adsorbent material is substantially spherical, ovoidal, oval or rod shaped.

10. Process according to claim 1, wherein the gas flow to be separated is air.

11. Process according to claim 1, wherein it is a VSA process or MPSA process.

12. A pressure swing adsorption process for the separation of air containing essentially oxygen and nitrogen, by preferential adsorption of nitrogen on at least one bed having a thickness e of adsorbent material of mean granulometry d in at least one separation zone, wherein the thickness of the bed of adsorbent material is selected such that:

$$400 \leq \frac{e}{\sqrt{d}} \leq 800$$

e and d being expressed in mm; the process being carried out at a cycle time of less than 120 seconds; the thickness being comprised between 0.1 m and 2 m; the adsorbent material being selected from zeolites of type X or A; and the mean granulometry being comprised between 0.1 mm and 5 mm.

* * * * *